United States Patent [19]
Alonso-Debolt

[11] Patent Number: 5,935,623
[45] Date of Patent: Aug. 10, 1999

[54] USE OF THERMALLY TREATED CLAYS IN ANIMAL FEEDS

[75] Inventor: Maria Alonso-Debolt, Kingwood, Tex.

[73] Assignee: Milwhite, Inc., Houston, Tex.

[21] Appl. No.: 09/007,607

[22] Filed: Jan. 15, 1998

[51] Int. Cl.⁶ ............................... A23K 1/00; A23K 1/18
[52] U.S. Cl. ................................ 426/2; 426/71; 426/74; 426/635; 424/438
[58] Field of Search ............................... 426/2, 74, 71, 426/635; 424/438

[56] References Cited

U.S. PATENT DOCUMENTS

| | | | |
|---|---|---|---|
| 3,687,680 | 8/1972 | Krchnavi et al. | 99/4 |
| 4,016,296 | 4/1977 | DeSantis | 426/69 |
| 4,265,916 | 5/1981 | Skoch et al. | 426/74 |
| 4,339,352 | 7/1982 | Pitts et al. | 252/449 |
| 4,386,010 | 5/1983 | Hildebrandt | 252/428 |
| 4,567,052 | 1/1986 | Nyfeler | 426/532 |
| 4,631,192 | 12/1986 | Mommer et al. | 426/69 |
| 4,687,861 | 8/1987 | Martin | 548/568 |
| 4,705,801 | 11/1987 | Martin et al. | 514/423 |
| 4,735,809 | 4/1988 | Donovan et al. | 426/69 |
| 4,775,539 | 10/1988 | Van de Walle | 426/74 |
| 4,778,901 | 10/1988 | Martin | 548/561 |
| 4,822,919 | 4/1989 | Martin et al. | 568/308 |
| 4,834,957 | 5/1989 | Van de Walle | 423/268 |
| 4,868,202 | 9/1989 | Martin et al. | 514/423 |
| 4,885,021 | 12/1989 | Elrod | 71/28 |
| 4,888,185 | 12/1989 | Miller | 425/72 |
| 4,994,284 | 2/1991 | Miller | 426/74 |
| 4,996,065 | 2/1991 | Van de Walle | 426/72 |
| 5,068,359 | 11/1991 | Huxley et al. | 549/58 |
| 5,079,201 | 1/1992 | Chu et al. | 502/68 |
| 5,095,029 | 3/1992 | Kleefeld et al. | 514/403 |
| 5,140,949 | 8/1992 | Chu et al. | 119/174 |
| 5,149,549 | 9/1992 | Beggs | 426/2 |
| 5,165,946 | 11/1992 | Taylor et al. | 426/74 |
| 5,192,547 | 3/1993 | Taylor | 424/438 |
| 5,639,492 | 6/1997 | Turk et al. | 426/2 |
| 5,698,599 | 12/1997 | Subbiah | 514/703 |

OTHER PUBLICATIONS

M. Barr, Activated Attaplugite, *Journal of the American Pharmaceutical Association*, vol. 19, No. 12, Dec., 1958.

Kirk–Othmer, Encyclopedia of Chemical Technology, John Wiley & Sons, 2nd Edition, 1967 pp. 541–586, 1964.

Company marketing brochure for the NovoSil™ product, date unknown.

*Primary Examiner*—Nina Bhat
*Attorney, Agent, or Firm*—Rosenthal & Osha LLP

[57] ABSTRACT

A method of promoting weight gain in an animal by feeding the animal calcined attapulgite which reduces adverse effects of a mycotoxin present in an animal food formulation. The calcined attapulgite is obtained by heating an attapulgite clay at or above 300° F. The calcined attapulgite can be fed to an animal in any form either before, after, or during intake of food by the animal. Furthermore, a mixture of calcined attapulgite and bentonite may be used, instead of calcined attapulgite itself. Also provided is an animal feed composition for promoting weight gain including calcined attapulgite. Such a composition reduces adverse effects of a mycotoxin-contaminated animal feed. The composition may further contain a bentonite clay.

24 Claims, 2 Drawing Sheets

USE OF THERMALLY TREATED CLAYS IN ANIMAL FEEDS

FIELD OF THE INVENTION

The present invention relates generally to methods and compositions of promoting weight gain in an animal by reducing adverse effects of a mycotoxin present in animal feeds.

BACKGROUND OF THE INVENTION

Mycotoxins are a group of structurally diverse, mold elaborated compounds that induce diseases known as mycotoxicosis in humans and animals. As much as twenty-five percent of the world's food crops are estimated to be contaminated with mycotoxins. Ingestion of sufficient quantities of mycotoxin-contaminated material leads to acute, and more commonly, chronic intoxication. As secondary mold metabolites, mycotoxins may contaminate animal feeds and human food ingredients in the absence of intact fungal elements. In many instances, processing of feed stuff may mask the presence of mold growth without concomitant destruction of mycotoxins. Mycotoxin-contaminated animal feeds and human foods are consumed worldwide, although their adverse health effects are not fully recognized. When a mycotoxicosis occurs in animals, it affects their health and reduces production efficiency because of increased susceptibility to infectious agents as a result of immune suppression. This has grave economic consequences. Furthermore, ingestion of such animals may have subtle health effects on humans which are not currently understood.

Although it is known that fungi are capable of producing mycotoxins that frequently contaminate the food consumed by humans and animals, precise factors that initiate mycotoxin production are not well defined. The exact type and extent of the mycotoxin contamination is a function of mold types, growth conditions during the crop season, and storage practices. Mycotoxins of major concern include aflatoxin, zearalenone, fumonosin, ochratoxin, vomitoxin, etc.

Aflatoxins are a group of potent liver toxins produced mainly by strains of *Aspergillus flavus* and *Aspergillus parasiticus*, which coexist with and grow on almost any crop or food. They are designated as aflatoxin $B_1$, $B_2$, $G_1$, $G_2$, $M_1$, etc. The most abundant and toxic member of aflatoxins under natural contamination is aflatoxin $B_1$, which is one of the most potent known hepatocarcinogens. Aflatoxins depress carbohydrate metabolism, decrease protein synthesis, impair lipid transport and key enzyme systems, and reduce natural defense mechanisms in animals. Generally, young animals are more susceptible to the toxic effects than mature animals. Poultry are more sensitive to the adverse effects of aflatoxins than mammals. Among domestic mammals, the approximate order of sensitivity from most to least is: dogs>young swine>pregnant sows>calves>fattening pigs>mature cattle>sheep. The relative resistance of mature ruminants is a result of rumen detoxification mechanisms.

Clinical aflatoxicosis is primarily a reflection of liver dysfunction. Subacute aflatoxicosis in swine is characterized by decreased feed conversion efficiency, depressed growth, toxic hepatitis, ictus, toxic nephritis, and hemorrhage enteritis. Daily exposure to aflatoxin for more than 7–10 days results in liver lesions of fibrosis, edema of the gall bladder, centrilobular hemorrhage, fatty change, cnecrosis, and biliary hyperplasia. In swine rations, dietary levels of 2–4 ppm aflatoxin lead to acute fatal toxicosis while rations containing 260 ppb for several weeks cause reduced growth rate. A protein-deficient diet enhances the toxicity of aflatoxin, while a high protein diet is somewhat ameliorating. There is extensive evidence that aflatoxin depresses cell mediated immune function, thus lowering the resistance of several animal species to bacterial, fungal and parasitic infections.

Cattle, sheep, and other ruminants appear less susceptible to aflatoxin than monogastric mammals or poultry. Calves, which are functionally monogastrics, are more susceptible than mature cattle. Generally, rations containing 1–2 ppm aflatoxin fed to mature cattle for a few weeks result in reduced weight gain and depressed milk production. Rations with as little as 1 ppm aflatoxin are lethal to steers within 60 days. Aflatoxicosis in cattle is mainly manifested by symptoms such as depression, anorexia, reduced growth, decreased milk production, subnormal body temperature and dry muzzle. As in several other species, lesions in the liver include fatty degeneration, vacuolated liver cells, liver necrosis, bile duct proliferation, and diffuse fibrosis.

Zearalenone is another mycotoxin of concern. It is a resorcyclic lactone produced primarily by fusarium roseum. This mycotoxin has been detected in corn, wheat, barley, oats, sorghum, rice, sesame, commercial rations, corn silage, corn meal and corn flakes. Zearalenone induces estrogenic effects in many species. Organs normally receptive to estrogenic compounds include tabular organs of female reproductive tract, ovaries, and mammae. Prepubertal female swine are most sensitive to zearalenone. They may ultimately develop rectal and vaginal prolapses. Other reported problems in female swine include anestrus, contraception failure, pseudopregnancy, decreased pigs per litter, and abortion. Zearalenone also induces feminization in immature male swine characterized by testicular atrophy, swelling of the prepuse and mammary glands. Mature male swine are highly resistant to the effects of zearalenone. Unusually high concentrations of zearalenone in cattle rations lead to infertility and udder enlargement.

In an effort to minimize the effect of mycotoxin-contaminated food supplies, numerous methods have been developed to control the formation of mycotoxins, to detoxify, or to decontaminate the contaminated foodstuff. Traditional methods of dealing with grains contaminated with mycotoxins are: blending a contaminated grain with a clean grain to reduce the contamination level, screening or using other means of physical separation to remove the highly contaminated grain, and ammoniation or heating to detoxify the contaminated grain. Although ammoniation of animal feeds results in a significant degradation of aflatoxins in peanuts, corn seed meals, and corn, the economic liability of ammoniation precludes it from practical applications.

In the meantime, various clays have been used as aflatoxin binders in animal feeds. For example, a montmorillonite clay mixed with a mycotoxin-contaminated animal feed was fed to animals to increase the nutritional value of the feed. Similarly, an acid-activated calcium bentonite clay mixed with a contaminated feed was fed to an animal to increase weight gain of the animal. In addition, a phyllosilicate material was also found to be capable of inactivating mycotoxins in an animal feed.

Although these methods achieved varying degree of success in reducing adverse effects of a single mycotoxin, they are generally not effective against a group of mycotoxins such as aflatoxin, fumonosin, ochratoxin, zearalenone, and the like. Because some or all of the mycotoxins frequently contaminate animal feeds, there is a need for a method and a animal feed composition which is effective in decreasing adverse effects of some or all of the mycotoxins, thereby promoting weight gain in animals.

SUMMARY OF THE INVENTION

In accordance with one aspect of the present invention, an animal feed composition for promoting weight gain in an animal includes a calcined attapulgite clay in an amount sufficient to reduce adverse effects of a mycotoxin present in an animal feed formulation. In some embodiments, the calcined attapulgite is in an amount of at least 0.25% by weight of the food formulation. In other embodiments, the mycotoxin present in an animal feed formulation includes at least one of aflatoxin, fumonosin, ochratoxin and zearalenone.

In accordance with another aspect of the present invention, an animal feed composition for promoting weight gain in an animal includes a calcined attapulgite clay and a bentonite clay in an amount sufficient to reduce adverse effects of a mycotoxin present in an animal feed formulation. In some embodiments, the calcined attapulgite clay and the bentonite clay are in an amount of at least 0.25% by weight of the food formulation respectively. In other embodiments, the mycotoxin present in an animal feed formulation includes at least one of aflatoxin, fumonosin, ochratoxin and zearalenone.

In accordance with yet another aspect of the present invention, an animal feed composition for promoting weight gain in an animal includes a calcined attapulgite clay in an amount of at least 0.5% by weight of an animal food formulation. The animal food formulation includes at least 20 parts per billion of a mycotoxin selected from the group consisting of aflatoxin, fumonosin, ochratoxin and zearalenone. In some embodiments, the animal feed composition further includes a bentonite clay in an amount of at least 0.5% by weight of the animal food formulation.

In another aspect, the invention relates to a method of promoting weight gain in an animal. The method includes feeding a calcined attapulgite clay to the animal in an amount sufficient to reduce adverse effects of a mycotoxin present in an animal food formulation. In some embodiments, the calcined attapulgite fed to the animal is mixed with the animal food formulation. In other embodiments, the calcined attapulgite is fed to the animal in an amount of at least 0.25% by weight of the animal food formulation. In still other embodiments, the mycotoxin present in the animal food formulation includes at least one of aflatoxin, fumonosin, ochratoxin and zearalenone.

In another aspect, the present invention relates to a method of promoting weight gain in an animal. The method includes feeding a calcined attapulgite clay and a bentonite clay to the animal in an amount sufficient to reduce adverse effects of a mycotoxin present in the animal food formulation. In some embodiments, the calcined attapulgite clay and the bentonite clay are mixed with the animal food formulation. In other embodiments, the calcined attapulgite clay and the bentonite clay are in an amount of at least 0.25% of the formulation by weight respectively. In still other embodiments, the mycotoxin present in the animal food formulation includes at least one of aflatoxin, fumonosin, ochratoxin and zearalenone.

In another aspect, the invention relates to a method of promoting weight gain in an animal. The method includes feeding a calcined attapulgite to the animal in an amount of at least 0.25% of an animal food formulation. The animal food formulation includes at least 20 parts per billion of at least one mycotoxin selected from the group consisting of aflatoxin, fumonosin, ochratoxin and zearalenone. In some embodiments, the method further includes feeding a bentonite clay to the animal in an amount of at least 0.25% by weight of the animal food formulation.

In another aspect, the invention relates to a method of manufacturing an animal feed composition for promoting weight gain in an animal. The method includes adding a calcined attapulgite clay to an animal food formulation. The calcined attapulgite is in an amount sufficient to reduce adverse effects of a mycotoxin present in the animal food formulation.

In another aspect, the invention relates to a method of manufacturing an animal feed formulation for promoting weight gain in an animal. This method includes adding a calcined attapulgite clay and a bentonite clay to an animal food formulation. The calcined attapulgite clay and the bentonite clay are in an amount sufficient to reduce adverse effects of a mycotoxin present in the animal food formulation.

Further aspects, features and advantages will become apparent from the following.

DESCRIPTION OF THE PREFERRED EMBODIMENTS

Figure 1:
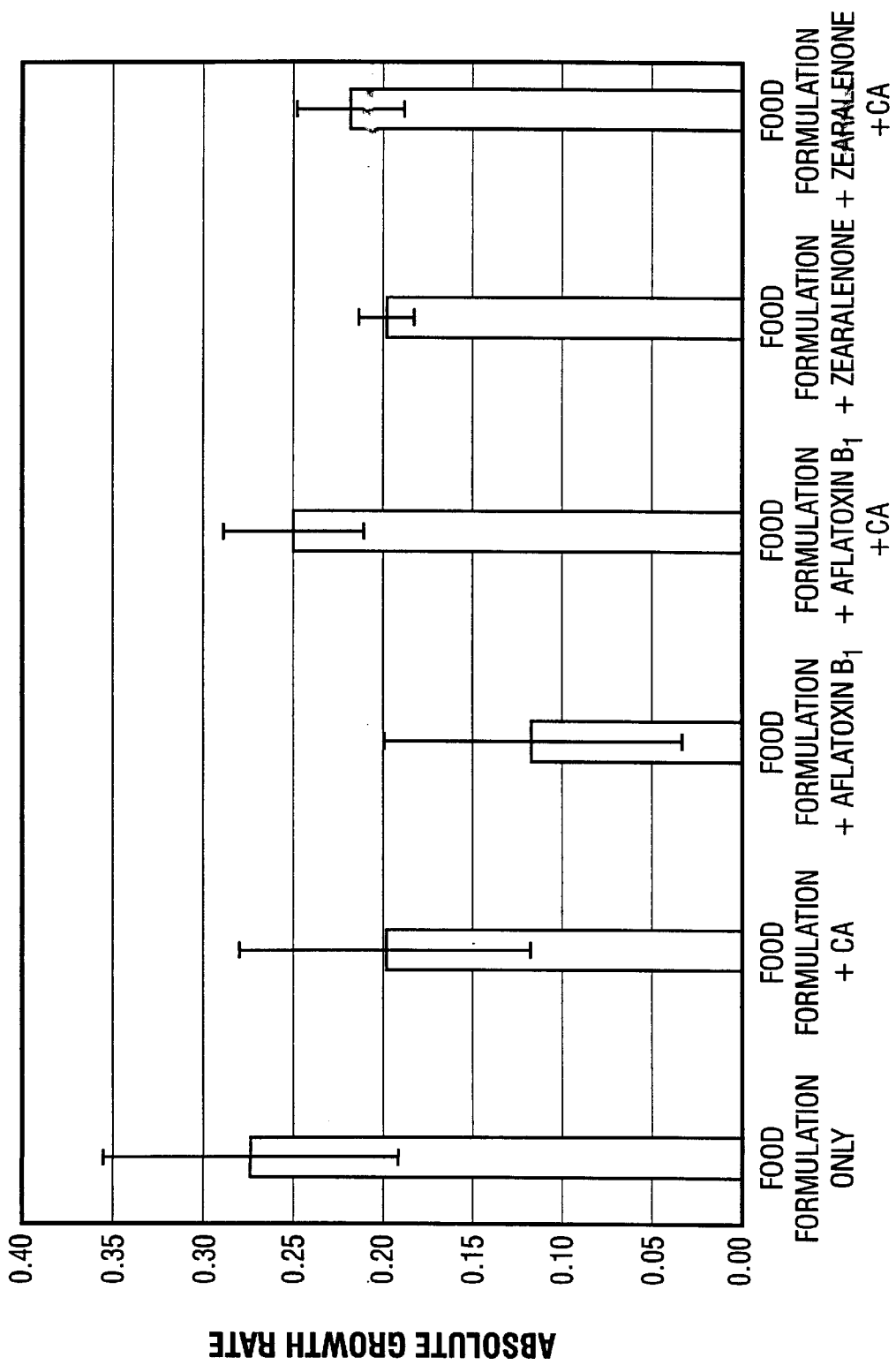
FIG. 1. is a bar graph of absolute growth rates of pigs in different treatment groups according to an embodiment of the invention, wherein CA stands for calcined attapulgite.

The invention is based upon the discovery that calcined attapulgite, when fed to an animal, reduces the adverse effects of mycotoxins and promotes weight gain in the animal. It is also found that the calcined attapulgite is even more effective when used in combination with a bentonite clay. The particular form of the clay, e.g., powdered, granular, compressed, dried, wet, noncompressed, pelletized, and the like, is not critical so long as the animal ingests the calcined attapulgite before, after or during the ingestion of the mycotoxin-contaminated animal feed.

Attapulgite, named from its occurrence at Attapulgus, Ga., possesses chain-like structures or combination chain-sheet structures. Attapulgite clay is composed principally of the mineral attapulgite, a crystalline hydrated magnesium aluminum silicate. It may also contain some impurities such as calcium carbonate, quartz and feldspar, and in some cases, sepiolite. A typical analysis of attapulgite yields 55.03% $SiO_2$, 10.24% $Al_2O_3$, 3.53% $Fe_2O_3$, 10.49% MgO, 0.47% $K_2O$, 9.73% $H_2O$ removed at 150° C., and 10.13% $H_2O$ removed at higher temperatures.

The attapulgite clay used in embodiments of the invention is obtained from mines in Attapulgus, Ga. Chunks of attapulgite are ground into powder form. Wet screen analysis of the powder indicates that about 20 to 25% of the powder passes a 325 mesh screen and about 3 to 5% of the powder passes a 200 mesh screen. Dry screen analysis of the same powder indicates that about 93 to 96% of the powder passes a 200 mesh screen. It should, however, be understood that the particle distribution disclosed here is not intended as a limitation, but an illustration of a preferred embodiment. Furthermore, the attapulgite clay necessary to practice embodiments of the invention is not limited to the one obtained from mines of Attapulgus, Ga. Any attapulgite clay will suffice.

Calcination of attapulgite may be conducted in any apparatus conventional in the art, for example, a rotary calciner. The calcination should be carried out at a temperature at or above 300° F., and preferably within the range of 300° F. to 1200° F. In a preferred embodiment, attapulgite clay is calcined at a temperature between 800 and 900° F. for about 25 minutes, although a variation from 15 to 50 minutes is also acceptable. The clay is then ground to a fine powder. It should be understood that it is also acceptable to grinde attapulgite clay into powder first and then calcine the powder subsequently.

The following examples illustrate embodiments of the invention and are not restrictive of the invention as otherwise described herein.

EXAMPLE 1

To evaluate the ability of calcined attapulgite to absorb mycotoxins, in-vitro binding capacity studies were conducted with respect to calcined and non-calcined attapulgite. Aflatoxin $B_1$, fumonosin $B_1$, ochratoxin A and zearalenone were selected in the in-vitro studies, although other mycotoxins may also be used. The general testing procedure was as follows:

Duplicate aliquots of a phosphate buffer (pH=3) mycotoxin solution (50 ml) was added to 100 ml screw cap polypropylene bottles which contained 0.5 gram of a clay to be tested. The bottles were placed on a rotator shaker for 30 minutes at room temperature. A 5 ml aliquot of each mycotoxin test solution was then centrifuged at 3000 rpm for 10 minutes and 2 ml of the aqueous supernatant was removed for mycotoxin analysis.

High Pressure Liquid Chromatography ("HPLC") was used for mycotoxin analysis. An aliquot of the original buffered mycotoxin test solution was used as an HPLC standard for each mycotoxin. HPLC analyses were performed on a Perkin-Elmer Model 250 liquid chromatograph pump equipped with an auto-sampler, a Perkin-Elmer 8.3 or 3.0 cm C18 column (3 $\mu$ particle size), and a Perkin-Elmer LS-4 fluorescence spectrophotometer for fluorescence detection. The flow rate of the mobile phase was 1 ml/min. The mobile phases and detection wavelengths for each mycotoxin analysis are listed in Table 1.

TABLE 1

| Mycotoxin | Mobile Phase | Detection |
| --- | --- | --- |
| Aflatoxin $B_1$ | water:methanol:propanol (40:17:2) | F: ex 365 nm em 430 nm |
| Fumonosin $B_1$ | acetone nitrile:1% aqueous KCl: acetic acid (40:60:1) | F: ex 335 em 450 nm |
| Ochratoxin A | methanol:water:acetic acid (40:60:1) | F: ex 365 em 450 nm |
| Zearalenone | methanol:water (35:45) | F: ex 274 em 465 nm |

The results of the in-vitro binding studies are presented in Table 2. The numbers in Table 2 represent the percentage of a mycotoxin bound by a particular clay. Mycotoxin concentrations used in these analyses were as follows: aflatoxin $B_1$ at 2 ppm, fumonosin $B_1$ at 4 ppm, ochratoxin A at 4 ppm and zearalenone at 2 ppm.

TABLE 2

| Clay | Aflatoxin $B_1$ | Fumonosin $B_1$ | Ochratoxin A | Zearalenone |
| --- | --- | --- | --- | --- |
| Non-calcined Attapulgite | 95.5% | 30% | N/A | 0.0% |
| Calcined Attapulgite | 100% | 83% | 78% | 95.1% |

The data in Table 2 show that calcined attapulgite is more effective in binding aflatoxin than uncalcined attapulgite. More importantly, calcined attapulgite is significantly better than uncalcined attapulgite in binding fumonosin, ochratoxin, and zearalenone. Because most digestive systems in non-ruminants are at approximately pH 3, the in-vitro studies were conducted at a pH around 3. But it should be understood that similar effects are expected at other pH values as well as for other mycotoxins.

EXAMPLE 2

In-vivo studies were conducted in swine to evaluate the effects of calcined attapulgite in animals. The procedure used to evaluate the effectiveness of calcined attapulgite against aflatoxin and zearalenone in swine was as follows:

Four-week old swine were weighed, tagged with plastic ear tags and placed in confinement with five pigs per pen. Animal feed was provided once a day in communal feeders, and water was available ad libitum. The feed was a food formulation containing corn, soybean meal, and a premix designed as a starter ration for young pigs. The composition of the formulation was as follows: 1054 lbs. ground corn, 500 lbs. 48% bean meal, 200 lbs dried whey, 60 lbs. animal fat, 50 lbs. sprayed dried blood meal (AP 301, American Proteins), 50 lbs pellet binder, 44 lbs. bi-calcium phosphate sold under the tradename of "DiCal," 10 lbs limestone, 2 lbs. L-lysine, 1 lb. dl-methionine, 1.5 lbs. copper sulfate, 5 lbs vitamin premix such as a UMC vitamin premix, and 3 lbs. trace mineral premix such as a UMC trace mineral premix. The amount of calcined attapulgite used in the studies was about 1% by weight of the food formulation. The amount of aflatoxin $B_1$ and zearalenone used was 1 ug/g and 4.0 ug/g of the food formulation respectively.

It should be understood that the food formulation is not limited to the above composition and weight percentage. Any formulation that provides nutrients to an animal may be used. Similarly, a person of ordinary skill in the art will recognize that a higher level of a mycotoxin or a lower level of a mycotoxin, e.g., 20 ppb, may be used and like results should follow. Furthermore, it should also be understood that any amount of calcined attapulgite is acceptable so long as the amount is sufficient to effectively reduce adverse effects of a mycotoxin. For example, calcined attapulgite in the amount of 0.25% of an animal food formulation should suffice.

Before a mycotoxin was added to a feed, a mycotoxin screen was done on this feed to confirm the absence of exogenous mycotoxins. Pigs were randomly assigned to six treatment groups: (1) food formulation only, (2) food formulation and calcined attapulgite only, (3) food formulation and aflatoxin, (4) food formulation, aflatoxin and calcined attapulgite, (5) food formulation and zearalenone, and (6) food formulation, zearalenone and calcined attapulgite. Pigs were weighed on study days 0, 4, 8, 11, 15 and 17. Absolute growth rates were calculated (Kg/day). The absolute growth rate is the amount of body weight gain in kilograms per day. Blood samples were also taken from each pig on days 0, 4, 11 and 18 and used for serum chemistry analysis. On day 18, all pigs were sacrificed for necropsy. The liver and the reproductive tract of each pig were analyzed. All pigs were examined for growth abnormalities.

The absolute growth rates obtained for all of the groups studied are summarized in Table 3 and FIG. 1. The results of these studies reveal that pigs fed food formulations mixed with calcined attapulgite and aflatoxin grew at significantly greater absolute rates than did those fed a food formulation with aflatoxin alone. In addition, pigs fed a food formulation mixed with zearalenone and calcined attapulgite gained more weight than those fed a food formulation with zearalenone only.

Before a mycotoxin was added to a feed, a mycotoxin screen was done on this feed to confirm the absence of exogenous mycotoxins. Pigs were randomly assigned to three treatment groups: (1) food formulation and bentonite only; (2) food formulation and aflatoxin only; and (3) food formulation, aflatoxin, and calcium bentonite. Pigs were

TABLE 3

| Group | Food Formulation Only | Food Formulation + Calcined Attapulgite | Food Formulation + Aflatoxin $B_1$ | Food Formulation + Aflatoxin $B_1$ + Calcined Attapulgite | Food Formulation + Zearalenone | Food Formulation + Zearalenone + Calcinated Attapulgite |
|---|---|---|---|---|---|---|
| Average Absolute Growth Rate (Kg/Day) | 0.2728 | 0.1980 | 0.1166 | 0.2508 | 0.1984 | 0.2194 |

Figure 2:
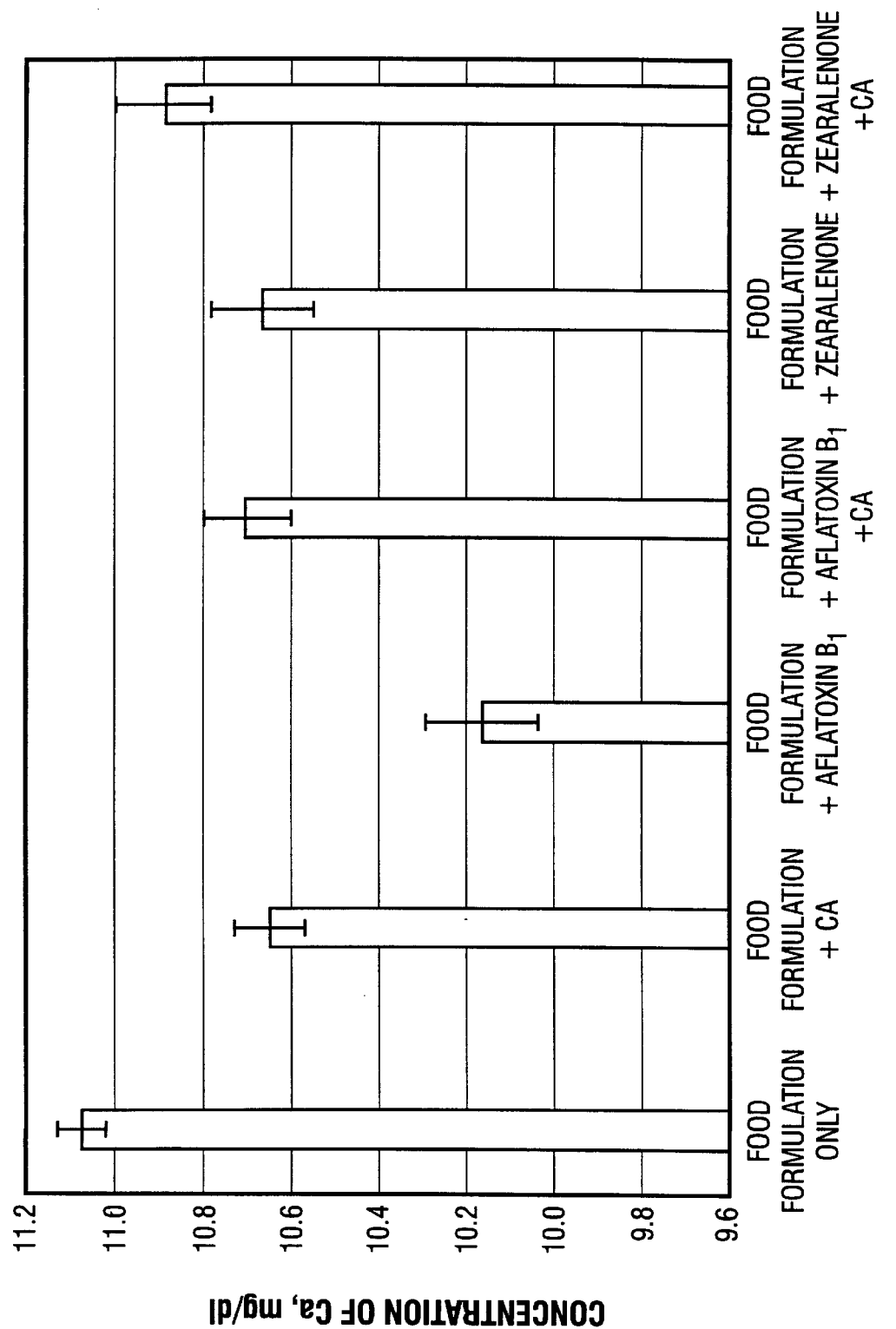
FIG. 2. is a bar graph of calcium concentrations in pigs of different treatment groups according to an embodiment of the invention. CA stands for calcined attapulgite.

As discussed above, in addition to reduction in feed conversion and body weight, another effect of aflatoxicosis is the enlargement of animal livers. The necropsy of the liver revealed that pigs fed a food formulation with aflatoxin and calcined attapulgite had smaller livers than pigs fed a food formulation with aflatoxin alone. Furthermore, the presence of calcined attapulgite in the food formulation causes a decrease in the calcium level in pigs. Analysis of the serum confirms that calcined attapulgite is capable of keeping the calcium level at a normal level in pigs fed a food formulation with aflatoxin and calcined attapulgite. FIG. 2 is a bar graph which indicates calcium concentrations for different treatment groups in the in-vivo studies.

Pigs fed zearalenone manifested the normal symptoms associated with this toxin, such as increased uterine weight. On the other hand, pigs fed zearalenone and calcined attapulgite had lower uterine weights than pigs fed zearalenone only. The average values are summarized in Table 4.

TABLE 4

| Group | Food Formulation + Calcined Attapulgite | Food Formulation + Zearalenone | Food Formulation + Calcinated Attapulgite + Zearalenone |
|---|---|---|---|
| Uterus, % Body Weight | 0.05 | 0.18 | 0.11 |

In addition, calcined attapulgite also alleviated the negative effects of zearalenone on serum calcium levels.

EXAMPLE 3

For purposes of comparison, an in-vivo study using calcium bentonite (i.e., hydrated sodium calciumaluminosilicate) was also conducted. The testing procedure was as follows:

Four-week-old swine were purchased from the University of Missouri swine herd. They were weighed, tagged with plastic ear tags and placed in confinement with five pigs per pen. A feed was provided once a day in communal feeders, and water was available ad libitum. The food formulation was as follows: 1054 lbs. ground corn, 500 lbs 48% bean meal, 200 lbs dried whey, 60 lbs. animal fat, 50 lbs. pellet binder, 44 lbs. di-calcium phosphate sold under the tradename of "DiCal," 10 lbs. limestone, 2 lbs. L-lysine, 1 lb. dl-methionine, 1.5 lbs. copper sulfate, 5 lbs. vitamin premix such as a UMC vitamin premix, and 3 lbs. trace mineral premix such as a UMC trace mineral mix.

weighed on study days 0, 4, 8, 11, 15 and 17. Blood samples were taken from each pig on days 0, 4, and 18 and were used for serum chemistry analysis. On day 18, all pigs were sacrificed for necropsy. All pigs were examined for growth abnormalities.

In this study, the amount of calcium bentonite used was about 1% by weight of the food formulation. The level of aflatoxin $B_1$ used was 1.0 ug/g of the food formulation. Absolute growth rates for the three treatment groups are summarized in Table 5.

TABLE 5

| Group | Food Formulation + Calcium Bentonite | Food Formulation + Aflatoxin $B_1$ | Food Formulation + Aflatoxin + Calcium Bentonite |
|---|---|---|---|
| Average Absolute Growth Rate (Kg/day) | 0.24 | 0.12 | 0.16 |

The results reveal that pigs fed calcium bentonite and aflatoxin $B_1$ had a higher absolute weight gain than did those pigs fed a food formulation of aflatoxin $B_1$ only. But the weight gain is not as pronounced as in the case of calcined attapulgite. This establishes that calcined attapulgite is superior to bentonite clays in alleviating the adverse effect of a mycotoxin in animals. Advantageously, a combination of calcined attapulgite and bentonite may result in more beneficial effects. In this embodiment, it should be understood that any type of bentonite, such as sodium bentonite, magnesium bentonite, lithium bentonite, potassium bentonite, etc., may be used instead of calcium bentonite. Furthermore, any amount of bentonite, e.g., 0.25% of a food formulation, may be used as long as the clay reduces the adverse effects of a mycotoxin.

As demonstrated above, calcined attapulgite is effective in binding a group of mycotoxins such as aflatoxin, fumonosin, ochratoxin and zearalenone. When fed to an animal with a food formulation, calcined attapulgite has resulted in weight gain in the animal by reducing adverse effects of the mycotoxins present in the food formulation. Furthermore, calcined attapulgite has also alleviated the normal symptoms manifested by an animal that ingested mycotoxin-contaminated food. It is also demonstrated that the beneficial effects of calcined attapulgite can be enhanced by adding a bentonite clay to calcined attapulgite.

While the invention has been disclosed with respect to a limited number of embodiments, those skilled in the art will appreciate numerous modifications and the variations therefrom. For example, although natural attapulgite is used in embodiments of the invention, synthetic materials with compositions and structures similar to natural attapulgite should function equivalently. It is also conceivable that the invention may be utilized in treating humans with similar health problems. Furthermore, the invention is effective not only against aflatoxin, fumonosin, ochratoxin and zearalenone, but also against any other mycotoxins such as ergotamine, vomitoxin, citrinin, T-2 toxin, sterigmatoxystin, deacstoxyscirpenol and the like. It is intended that the appended claims cover all such modifications and variations as fall within the true spirit and scope of the invention.

What is claimed is:

1. An animal feed composition for promoting weight gain in an animal comprising:
   a mycotoxin contaminated animal food formulation;
   a calcined attapulgite clay in an amount sufficient to reduce adverse effects of a mycotoxin present in the mycotoxin contaminated animal food formulation.

2. The animal feed composition of claim 1, wherein the calcined attapulgite is in an amount of at least 0.25% by weight of the mycotoxin contaminated animal food formulation.

3. The animal feed composition of claim 1, wherein the mycotoxin comprises at least one of aflatoxin, fumonosin, ochratoxin and zearalenone.

4. The animal feed composition of claim 1, wherein the mycotoxin present in the mycotoxin contaminated animal food formulation is in an amount of at least 20 parts per billion by weight.

5. An animal feed composition for promoting weight gain in an animal comprising:
   a mycotoxin contaminated animal food formulation;
   a calcined attapulgite clay and a bentonite clay in an amount sufficient to reduce adverse effects of a mycotoxin present in the mycotoxin contaminated animal food formulation.

6. The animal feed composition of claim 5, wherein the calcined attapulgite clay and the bentonite clay are in an amount of at least 0.25% by weight of the mycotoxin contaminated animal food formulation respectively.

7. The animal feed composition of claim 5, wherein the mycotoxin comprises at least one of aflatoxin, fumonosin, ochratoxin and zearalenone.

8. The animal feed composition of claim 5, wherein the mycotoxin present in the animal mycotoxin contaminated animal food formulation is in an amount of at least 20 parts per billion by weight.

9. An animal feed composition for promoting weight gain in an animal comprising:
   a mycotoxin contaminated animal food formulation;
   a calcined attapulgite clay in an amount of at least 0.5% by weight of the mycotoxin contaminated animal food formulation, wherein the mycotoxin contaminated animal food formulation includes at least 20 parts per billion of a mycotoxin selected from the group consisting of aflatoxin, fumonosin, ochratoxin, and zearalenone.

10. The animal feed composition of claim 9, further comprising:
    a bentonite clay in an amount of at least 0.5% by weight of the mycotoxin contaminated animal food formulation.

11. A method of promoting weight gain in an animal comprising:
    feeding a mycotoxin contaminated animal food formulation and a calcined attapulgite clay to the animal in an amount sufficient to reduce adverse effects of a mycotoxin present in the mycotoxin contaminated animal food formulation.

12. The method of claim 11, wherein the calcined attapulgite fed to the mycotoxin contaminated animal is mixed with the animal food formulation.

13. The method of claim 12, wherein the calcined attapulgite is fed to the mycotoxin contaminated animal in an amount of at least 0.25% by weight of the animal food formulation.

14. The method of claim 11, wherein the mycotoxin comprises at least one of aflatoxin, fumonosin, ochratoxin and zearalenone.

15. The method of claim 11, wherein the mycotoxin is present in the mycotoxin contaminated animal food formulation in an amount of at least 20 parts per billion by weight.

16. A method of promoting weight gain in an animal comprising:
    feeding a mycotoxin contaminated animal food formulation and a calcined attapulgite clay and a bentonite clay to the animal in an amount sufficient to reduce adverse effects of a mycotoxin present in mycotoxin contaminated animal food formulation.

17. The method of claim 16, wherein the calcined attapulgite clay and the bentonite clay are mixed with the mycotoxin contaminated animal food formulation.

18. The method of claim 17, where the calcined attapulgite clay and the bentonite clay are in an amount of at least 0.25% of the mycotoxin contaminated animal food formulation by weight respectively.

19. The method of claim 16, wherein the mycotoxin comprises at least one of aflatoxin, fumonosin, ochratoxin, and zearalenone.

20. The method of claim 16, wherein the mycotoxin is present in the mycotoxin contaminated animal food formulation in an amount of at least 20 parts per billion by weight.

21. A method of promoting weight gain in an animal comprising:
    feeding a mycotoxin contaminated animal food formulation and a calcined attapulgite clay to the animal in an amount of at least 0.25% of the mycotoxin contaminated animal food formulation, wherein the mycotoxin contaminated animal food formulation includes at least 20 parts per billion of at least one mycotoxin selected from the group consisting of aflatoxin; fumonosin, ochratoxin, and zearalenone.

22. The method of claim 21, further comprising:
    feeding a bentonite clay to the animal in an amount of at least 0.25% by weight of the mycotoxin contaminated animal food formulation.

23. A method of manufacturing an animal feed composition for promoting weight gain in an animal comprising:
    adding a calcined attapulgite clay to a mycotoxin contaminated animal food formulation, wherein the calcined attapulgite is in an amount sufficient to reduce adverse effects of a mycotoxin present in the mycotoxin contaminated animal food formulation.

24. A method of manufacturing an animal feed composition for promoting weight gain in an animal comprising:
    adding a calcined attapulgite clay and a bentonite clay to a mycotoxin contaminated animal food formulation, wherein the calcined attapulgite clay and the bentonite clay are in an amount sufficient to reduce adverse effects of a mycotoxin present in the mycotoxin contaminated animal food formulation.

* * * * *